(12) United States Patent
Kaneko

(10) Patent No.: US 8,323,823 B2
(45) Date of Patent: Dec. 4, 2012

(54) BATTERY PACK WITH DRAWER PORTION

(75) Inventor: Yoshikazu Kaneko, Tokyo (JP)

(73) Assignee: Sony Corporation, Tokyo (JP)

( * ) Notice: Subject to any disclaimer, the term of this patent is extended or adjusted under 35 U.S.C. 154(b) by 1172 days.

(21) Appl. No.: 11/831,621

(22) Filed: Jul. 31, 2007

(65) Prior Publication Data

US 2008/0081249 A1 Apr. 3, 2008

(30) Foreign Application Priority Data

Aug. 2, 2006 (JP) ................. P2006-210500

(51) Int. Cl.
*H01M 2/24* (2006.01)

(52) U.S. Cl. ........ 429/158; 429/149; 429/176; 429/177; 429/163

(58) Field of Classification Search .................. 429/176, 429/177, 163, 158, 149
See application file for complete search history.

(56) References Cited

U.S. PATENT DOCUMENTS

| 6,319,630 | B1 | 11/2001 | Hasegawa et al. |
| 6,368,744 | B1 | 4/2002 | Hatazawa et al. |
| 6,773,848 | B1 | 8/2004 | Nortoft et al. |
| 6,822,420 | B2 | 11/2004 | Kozu et al. |
| 7,198,866 | B2 | 4/2007 | Miyamoto et al. |
| 2003/0146734 | A1* | 8/2003 | Kozu et al. ..................... 320/107 |
| 2006/0166086 | A1* | 7/2006 | Kato ............................. 429/153 |
| 2006/0257731 | A1* | 11/2006 | Yoon ............................ 429/176 |

FOREIGN PATENT DOCUMENTS

| JP | 2000-156208 | | 6/2000 |
| JP | 2000-268807 | | 9/2000 |
| JP | 2002-100337 | | 4/2002 |
| JP | 2002117828 A | * | 4/2002 |
| JP | 2003-530658 | | 10/2003 |
| JP | 2004-47167 | | 2/2004 |

* cited by examiner

Primary Examiner — Barbara Gilliam
Assistant Examiner — Zachary Best
(74) Attorney, Agent, or Firm — K&L Gates LLP

(57) ABSTRACT

A battery pack is provided that includes a plurality of batteries, a connection substrate being connected to the plurality of batteries, a circuit substrate for connecting an external electronic device, and a connection member for connecting the connection substrate and the circuit substrate. Each battery has a drawer portion for leading out a cathode terminal and an anode terminal provided at a same side of the battery. The drawer portion has wall portions standing against the drawer portion so that the side portions of the drawer portion are opposed each other. The plurality of batteries are arranged in row so that the drawer portion of the plurality of batteries face to a same direction. A part of the connection substrate is disposed on the drawer portion of the battery. The rim of the connection substrate is provided with cutouts to let the wall portions disposed therein.

7 Claims, 9 Drawing Sheets

Prior Art

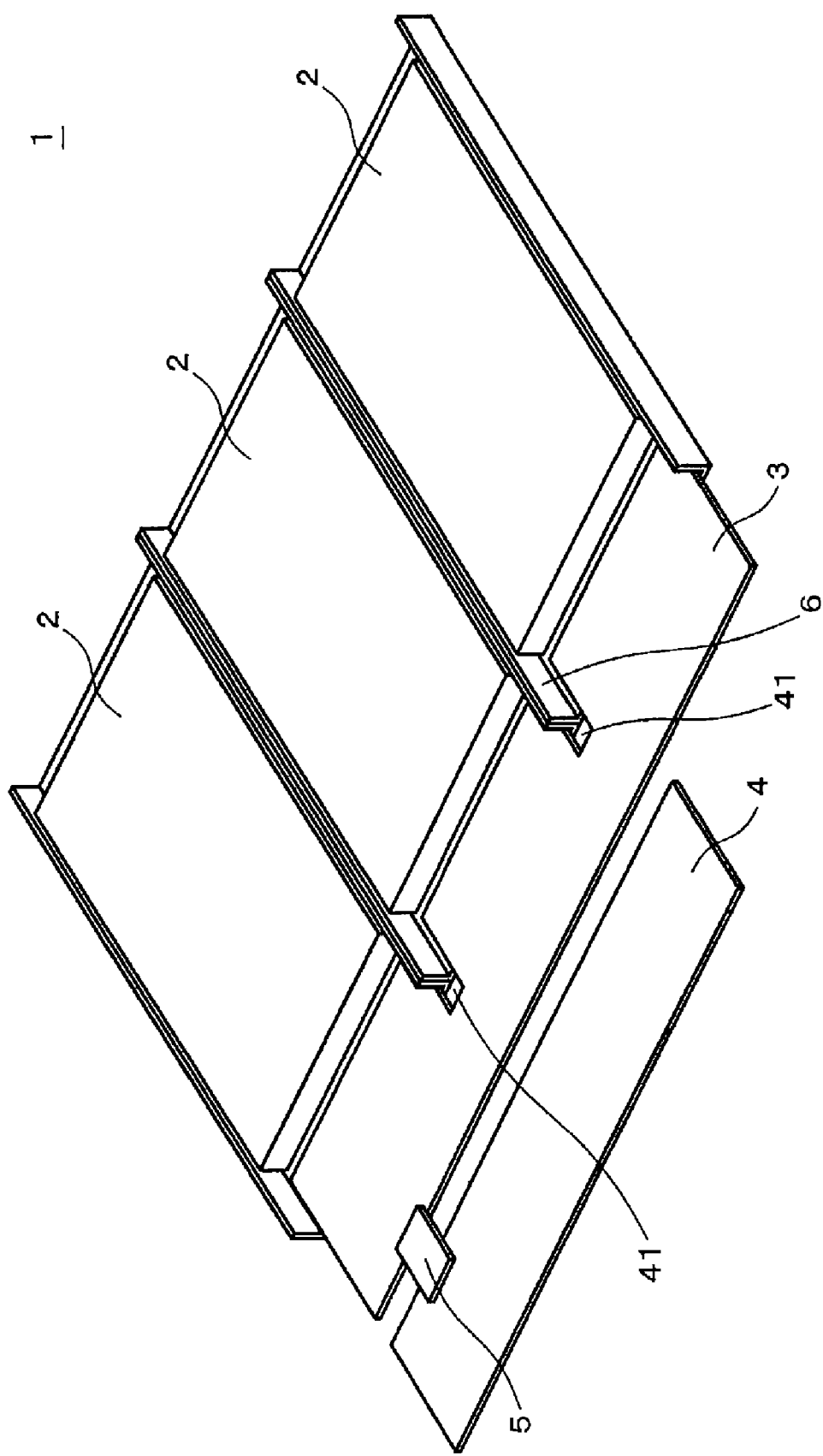

BATTERY PACK WITH DRAWER PORTION

CROSS REFERENCES TO RELATED APPLICATIONS

The present application claims priority to Japanese Patent Application JP 2006-210500 filed in the Japanese Patent Office on Aug. 2, 2006, the entire contents of which being incorporated herein by reference.

BACKGROUND

The disclosure of the present application relates to a battery pack for connecting a plurality of batteries.

Recently, portable electronic devices such as a notebook personal computer, a mobile phone and a PDA (Personal Digital Assistants) have been spread and a lithium ion secondary battery having advantages such as high voltage, high energy density and light weight structure has been widely utilized as a power supply of such electronic devices.

In a notebook computer, for example, a cylindrical type lithium ion secondary battery using a electrolytic solution as an electrolyte is typically used, and these days the usage opportunity of a gel polymer electrolyte obtained on impregnating a polymeric material with a non aqueous electrolytic solution a flattened type lithium-ion polymer secondary battery using an all-solid polymer electrolyte, etc. is increasing.

A lithium ion polymer secondary battery has a cathode, an anode, and a polymer electrolyte, and includes a battery cell of which battery elements being lead out respective terminal of cathode and anode are coated with such as external film. In addition, the battery pack is configured to he accommodated in a box type plastic mold case including, for example, an upper case and a lower case, together with a circuit substrate on which a battery cell and a circuit are mounted.

It is desired to make a large capacity battery pack in an electronic device such as a notebook computer, so that the electronic device can be used for a long time. Accordingly, a battery pack which is connected a plurality of same type battery cells in parallel in order to increase the capacity of the battery pack.

Now, a conventional battery pack 100 is briefly explained with reference to figures. Referring to FIG. 1 and FIG. 2, a plurality of flattened type battery cells 102 are arranged in the conventional battery pack 100, which is constructed that a cathode terminal 111a and an anode terminal 111b (hereinafter electrode terminal 111 otherwise showing a specified electrode terminal) of each battery cell 102 are connected to a circuit substrate 103 to be accommodated in an enclosure such as a housing including an upper case and a lower case.

The battery cell 102 is constructed to be accommodated in a soft laminated film where for example battery elements are formed in rectangular, and wall portions 105 are formed by bending the laminated film. And on a surface surrounded by the wall portions 105, a drawer portion 104 which leads out electrode terminals is formed.

As described above, a battery cell for accommodating battery elements in a laminated film having wall portions at its sides by bending the laminated film is described in Japanese Unexamined Patent Application Publication No. 2000-156208.

A charge and discharge control FET (Field Effect Transistor), a protective circuit including IC (Integrated Circuit) for monitoring a secondary battery and controlling the charge and discharge control FET, a connector for connecting to an external element, and so on are mounted on the circuit substrate 103. Furthermore, a contact member 112 for connecting to the electrode terminal 111 is provided at the circuit substrate 103.

There are various shapes and sizes of the battery pack 100 depending on an electronic device which uses the battery pack 100. In other words, the shape and the size of the battery pack 100 is determined in accordance with the shape and the size of the space in the electronic device where the battery pack 100 is accommodated. Moreover, since the shape and the size of the battery cell 102 is defined according to its charge and discharge capacity and its charge and discharge current volume, the shape and the size of the circuit substrate 103 is determined based on the shape and the size of the battery pack 100 and the battery cell 102.

Therefore, when the battery cell 102 is connected to the circuit substrate 103, there may be a case where the electrode terminal 111 cannot be directly connected to a contact member provided on the circuit substrate 103. In this case, the battery cell 102 and the circuit substrate 103 are electrically connected via relay tab 101 in the manner that the electrode terminal 111 and a relay tab 101 are connected, and then the relay tab and the circuit substrate 103 are connected. For such relay tab 101, a conductive steel plate such as aluminum Al or nickel Ni is used.

It is desirable to reduce unnecessary space in the battery pack as much as possible and improve the volumetric efficiency since a battery pack used for a portable electronic device, etc. is desired to be compact as well as large capacity and high power output.

However, there was a problem that when a battery pack was constructed by arranging such plurality of battery cells, wall portions provided in the battery cell prevent the arrangement of substrate in a drawer portion, which resulted in decrease of volumetric efficiency due to unnecessary space caused by the drawer portion.

Furthermore, there was another problem that since the wiring pattern for connecting electrode terminal cannot be linearly wired over the circuit substrate 103 as shown in FIG. 2, the dimension over the circuit substrate was more than is actually required.

Moreover, the shape and the size of the circuit substrate vary depending on the shape and the size of the battery pack. In addition, the protective circuit mounted on the circuit substrate varies depending on the property of the battery cell used in the battery pack such as charge and discharge voltage, and charge and discharge current. Thus, it is difficult to divert an existing circuit substrate. That is, when a battery pack is newly designed, there was a problem that a circuit substrate has to be newly designed correspondingly, which resulted in the increase of design cost.

Additionally, when the battery cell and the circuit substrate were connected through the relay tab, there was a problem that the addition of the relay tab itself and the process for connecting the relay tab resulted in the increase of production cost.

Therefore, it is desirable to provide a battery pack which utilizes the space to improve volumetric efficiency.

Additionally, it is desirable to provide a battery pack which downsizes a circuit substrate to make the whole size compact.

Furthermore, it is desirable to provide a battery pack which can divert a circuit substrate to reduce production cost.

SUMMARY

According to an embodiment, there is provided a battery pack which includes a plurality of batteries, a connection substrate being connected to the plurality of batteries, a circuit substrate for connecting an external electronic device, and a connection member for connecting the connection substrate and the circuit substrate, wherein each battery has a drawer portion for leading out a cathode terminal and a anode terminal provided at a same side of the battery, the drawer portion has wall portions standing against the drawer portion so that the side portions of the drawer portion are opposed each other, the plurality of batteries are arranged in a row so that the drawer portions of the plurality of batteries face to a same direction, a part of the connection substrate is disposed on the drawer portion of the battery, and the rim of the connection substrate is provided with cutouts to let the wall portions be disposed therein.

According to the embodiment, when the plurality of batteries arranged so as to face one direction, including the drawer portion which leads out the cathode terminal and the anode terminal provided at the same side thereof and wall portions standing against the drawer portion so that the side portions of the drawer portion opposes each other, are connected to the substrate, a part of the substrate is disposed on the drawer portion of the battery so that the wall portions are disposed in the cutouts provided at the rim of the substrate.

As described above, according to the embodiment, the plurality of batteries where the cutouts provided on the connection substrate are arranged so as to let the wall portions provided at the both sides of the drawer portion be disposed in the cutouts and to face the same direction as the drawer portion is connected to the substrate, and the arrangement of a part of the substrate on the drawer portion reduce unnecessary space in the battery pack, which results in the improvement of volumetric efficiency.

In addition, when the first and the second contact members are arranged onto different parallel lines respectively, patterned wiring for connecting contact member each other can be provided in parallel. Thus, the patterned wiring can be efficiently wired and downsize the connection substrate, which results in the downsizing of the battery pack.

Moreover, in the case of a configuration where the connection substrate and the circuit substrate are connectable and disconnectable by means of the connection member, the connection substrate and the circuit substrate can be connectable and disconnectable. Accordingly, the connection substrate can be diverted, which results in the reduction of production cost.

Furthermore, since the connection substrate for connecting the plurality of battery cells and the circuit substrate are connectable and disconnectable and the connection substrate can be diverted, fabrication cost can be reduced when a new battery pack is fabricated.

These and other objects and features will become more apparent in light of the following detailed description, as illustrated in the accompanying drawings, Additional features and advantages are described herein, and will be apparent from, the following Detailed Description and the figures.

BRIEF DESCRIPTION OF THE FIGURES

FIG. 3 is a perspective view showing an example arrangement of a battery pack according to an embodiment;

DETAILED DESCRIPTION

Figure 1:
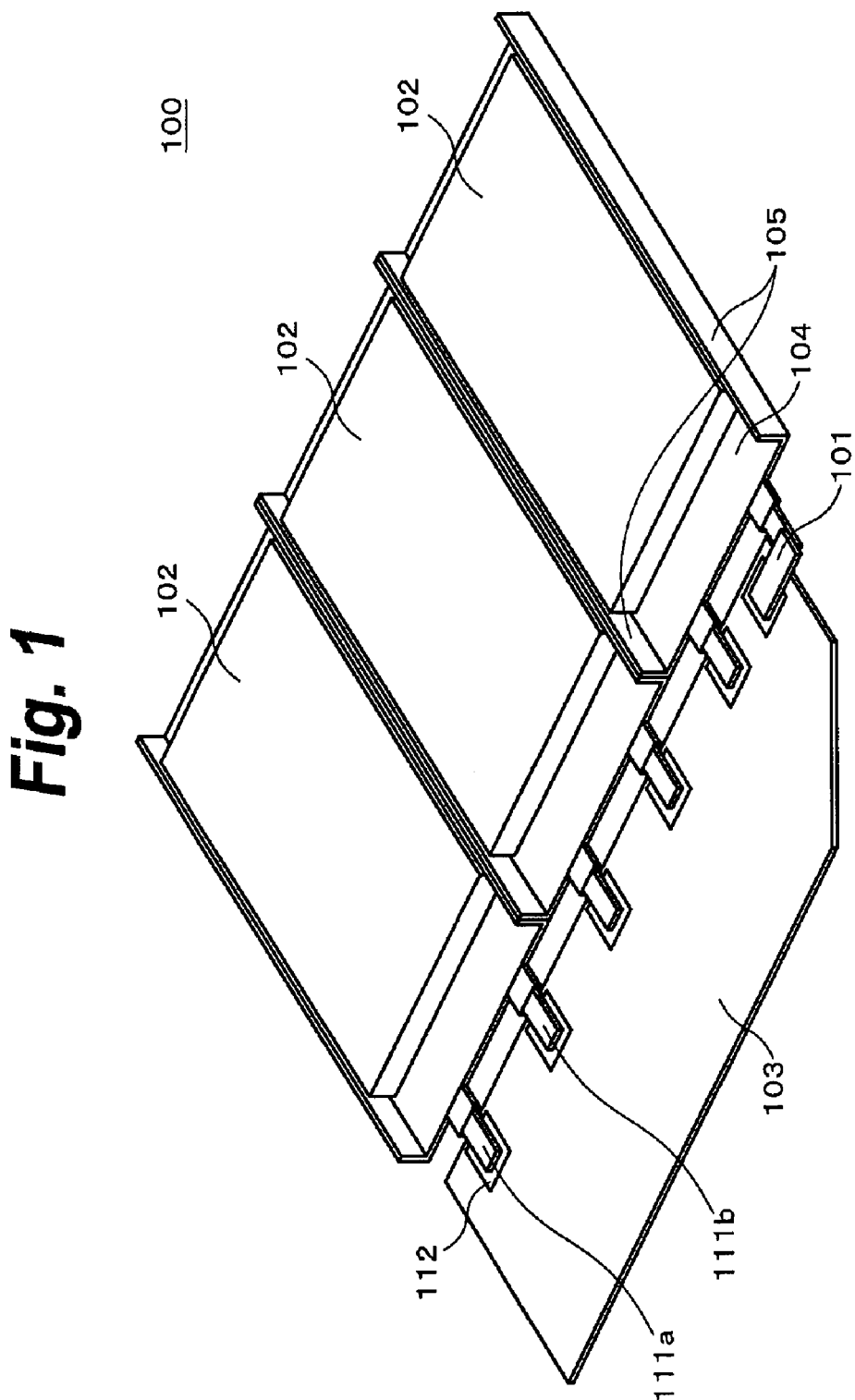
FIG. 1 is a perspective view showing an example arrangement of a conventional battery pack.
Figure 2:
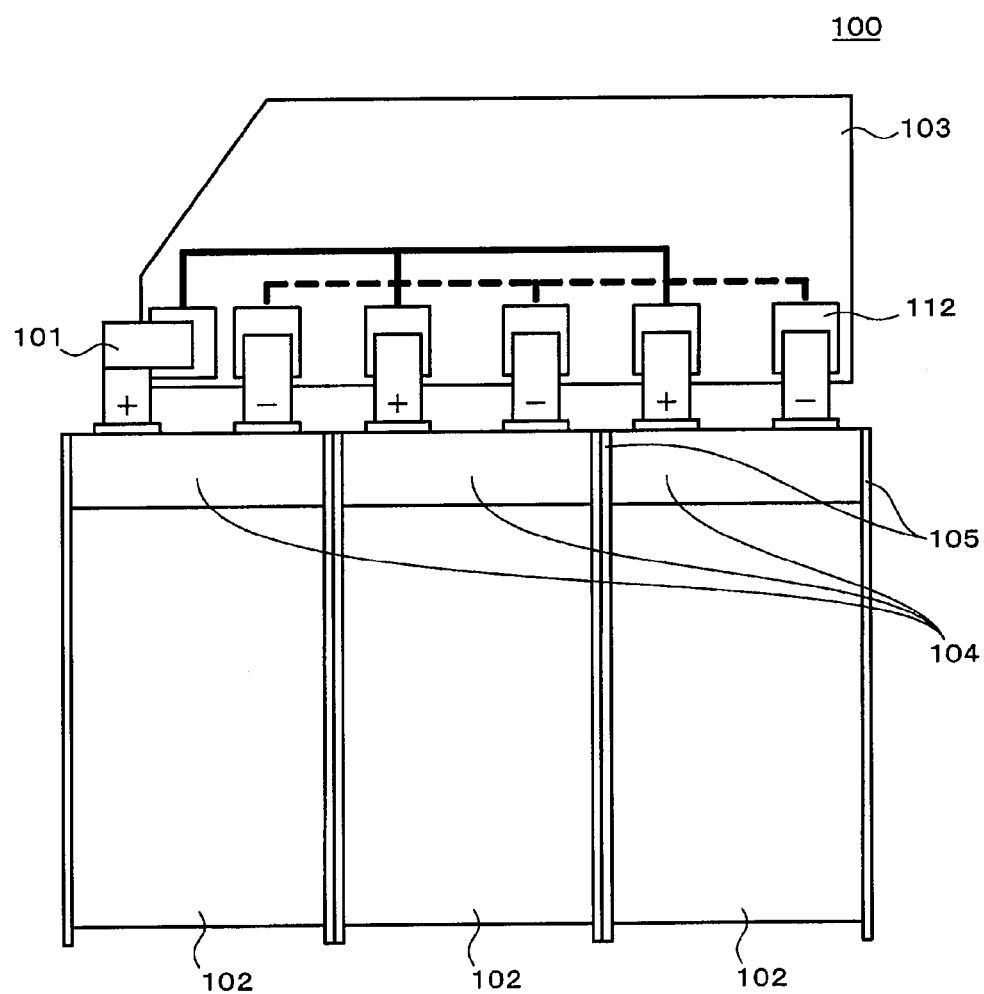
FIG. 2 is a front view showing the front surface of the conventional battery pack.
Figure 4A:
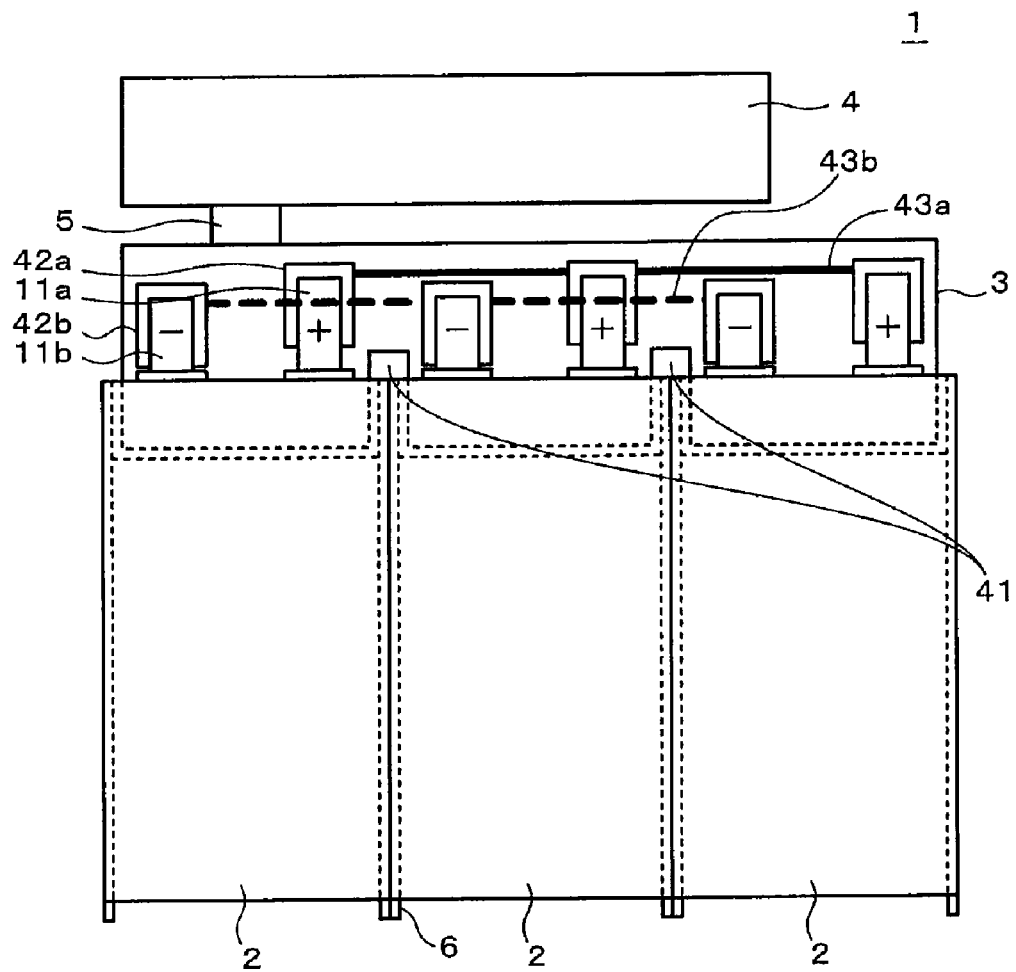
FIG. 4A and FIG. 4B are bottom views of the battery pack according to the embodiment.

Described below is an explanation of a battery pack of an embodiment with respect to figures. Referring to FIG. 3 and FIG. 4A, a plurality of flattened type battery cells 2 are arranged in a battery pack 1 so as to bring together each wall portion 6 provided at the both sides of the battery cell. And then, a cathode terminal 11a and an anode terminal 11b (hereinafter electrode terminal 111 otherwise showing a specified electrode terminal) of each battery cell 2 is connected to a cell connection substrate 3 as well as that the cell connection substrate 3 and a circuit substrate 4 are connected through a connection member 5, and is accommodated in an enclosure such as a box housing including an upper case and a lower case, according to necessity.

The cell connection substrate 3 is a substrate for connecting the plurality of battery cells 2 in series or in parallel. Referring to FIG. 4A, the cell connection substrate 3 is provided with a contact member for cathode 42a, for connecting a cathode terminal 11a of each battery cell 2, a contact member for anode 42b for connecting an anode terminal 11b, a patterned wiring for cathode 43a for connecting a plurality of the contact member for cathode 42a, and a patterned wiring for anode 43b for connecting a plurality of the contact member for anode 42b. In addition, the cell connection substrate 3 is configured to be connected to the circuit substrate 4 through the connection member 5. From then, one surface of the cell connection substrate 3 where the contact member for cathode 42a and the contact member for anode 42b are provided is called the back surface, and the opposite side of the back surface is called the front surface.

Furthermore, the cell connection substrate 3 has, for example, rectangular shape, and one or more cutout 41 is provided on the longitudinal line. This cutout 41 is provided in order to avoid the wall portions 6 standing on the both sides of the battery cell when arranging the cell connection substrate 3.

The contact member for cathode 42a and the contact member for anode 42b are arranged on the back surface in the manner that providing a predetermined difference for the position in widewidth direction of the cell connection substrate 3. Additionally, multi-layer substrate such as double-face substrate is used for the cell connection substrate 3.

For example, when a double-face substrate is used for the cell connection substrate 3, the patterned wiring for cathode 43a for connecting the contact member for cathode 42a is wired on the back surface, and the patterned wiring for anode 43b for connecting the contact member for anode 42b is wired on the front surface. In this regard, since the contact member for cathode 42a is positioned at a different place from the contact member for anode 42b, the patterned wiring for cathode 43a can be linearly wired without touching the contact member for anode 42b. Moreover, patterned wiring for anode 43b is wired on the front surface, it can be linearly wired without touching the contact member for cathode 42a.

Figure 4B:
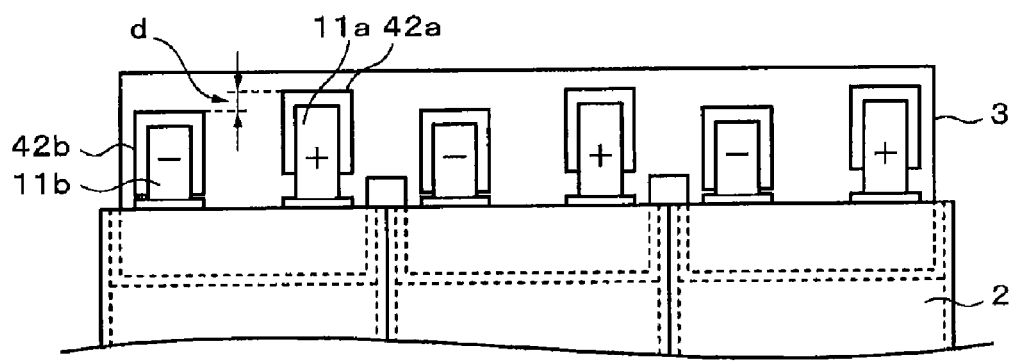

Referring to FIG. 4B, the position difference d between the contact member for cathode 42a and the contact member for anode 42b is preferably, for example, 2 mm or more and 10 mm or less. This is because at least 2 mm is necessary to provide the patterned wiring for cathode 43a on the cell connection substrate 3 without touching the contact member for anode 42b, and it should be 10 mm or less in order to keep the cell connection substrate 3 in a practical size.

Temperature protective elements such as fuse and thermister, the charge and discharge control FET, the protective circuit including IC for monitoring the secondary battery and controlling the charge and discharge control FET, and the connector to be connected to external elements are mounted on the circuit substrate 4. The connection member 5 is for connecting and separating the cell connection substrate 3 and the circuit substrate 4. For the connection member 5, for example, a connector and wire rods can be used.

Figure 5:
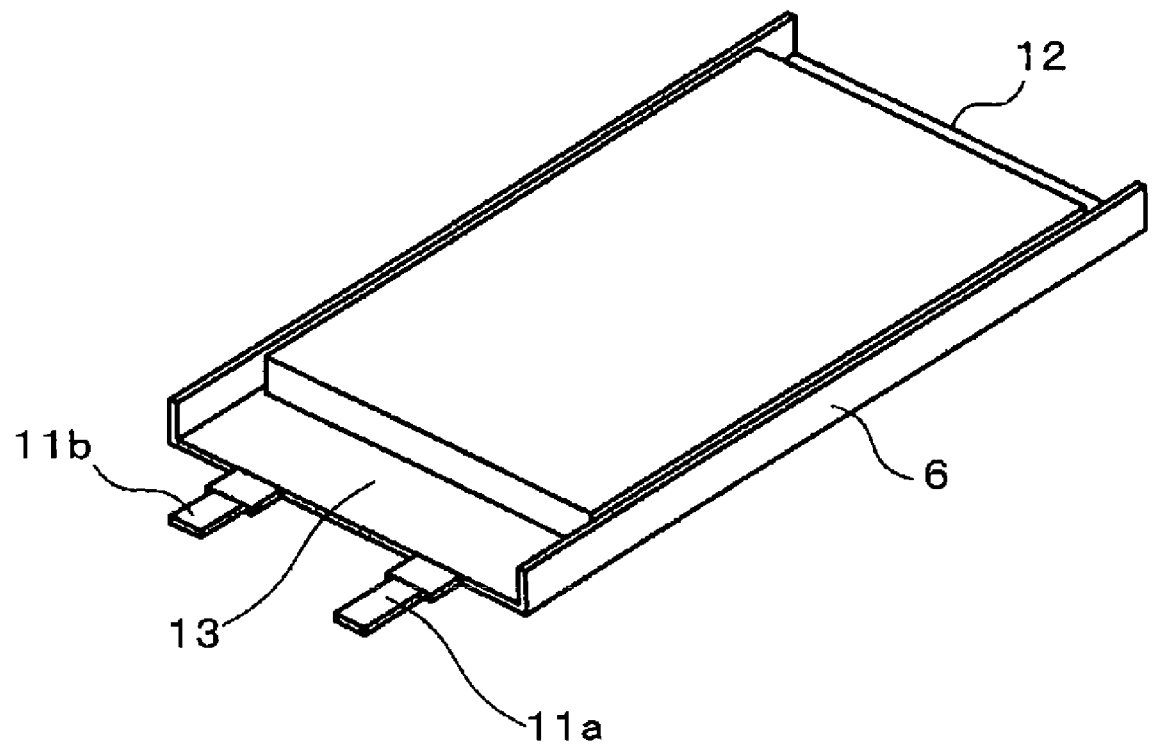
FIG. 5 is a perspective view showing the appearance of the battery cell applicable to the embodiment.

Referring to FIG. 5, the battery cell 2 is configured that battery elements being described later is accommodated in a soft laminated film 12 which is formed, for example, rectangular. Also, at the both sides of the battery cell 2, standing wall portions 6 are formed. Furthermore, on the surface surrounded by the wall portions 6, a drawer portion 13 which leads out the cathode terminal 11a and the anode terminal 11b which are respectively connected to the battery element accommodated in the soft laminated film 12 is constructed.

Figure 6:
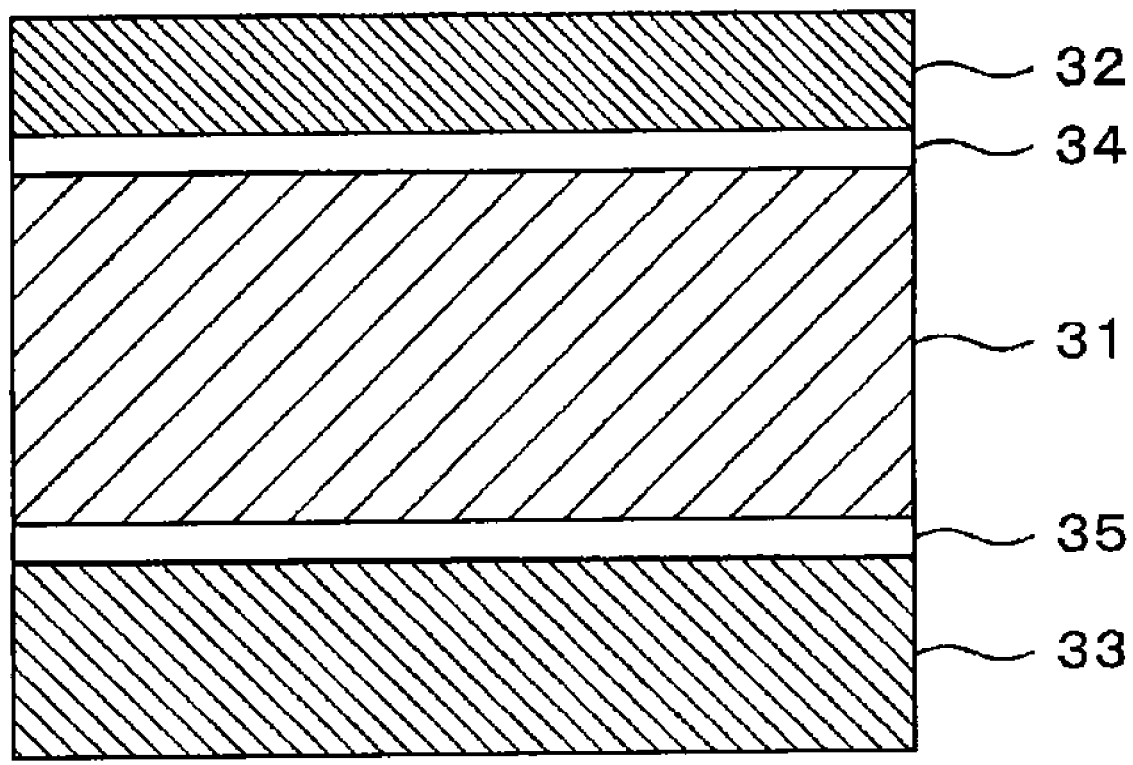
FIG. 6 is a schematic diagram showing one example of soft laminated film layer arrangement.

Referring to FIG. 6, the soft laminated film 12 is constructed by a multi-layer film having vapor proof and insulating performance, where a metal foil 31 is positioned between an exterior layer 32 and a sealant layer 33.

For the metal layer 31, soft metal material is used and this layer has roles not only enhancing the strength of exterior material but also protecting battery element therein by preventing penetration of oxygen and light. Aluminum 41 is preferable for the soft metal material in the view of lightness, extensibility, cost, and the ease of process, preferably aluminum including 8021-O or 8079-O, etc. with approximate thickness range of 30 μm to 130 μm. In addition, the metal layer 31 and an exterior layer 32, and the metal layer 31 and the sealant layer 33 are attached each other through adhesion layers 34 and 35 respectively. The adhesion layer 34 may be omitted if unnecessary.

For the exterior layer 32, polyolefin based resin, polyamide based resin, polyimide based resin, polyester, and so on are used in the view of beauty of appearance, strength, flexibility, etc. Specifically, nylon Ny, polyethylene terephthalate PET, polyethylene naphthalate PEN, poly butylene terephthalate PBT, poly butylene naphthalate PBN are used, and the several types of these may be combined to be used. The thickness of the exterior layer 32 is for example, approximately 10 μm to 30 μm.

Additionally, the sealant layer 33 is a part where is melt by heat or ultra sonic to be fused each other, and polyethylene PE, anaxial stretching polypropylene CPP, polyethylene terephthalate PET, and nylon Ny, as well as low density polyethylene LDPE, high density polyethylene HDPE, and straight chain low density polyethylene LLDPE can be used, and the several type of these may be combined to be used.

Figure 7:
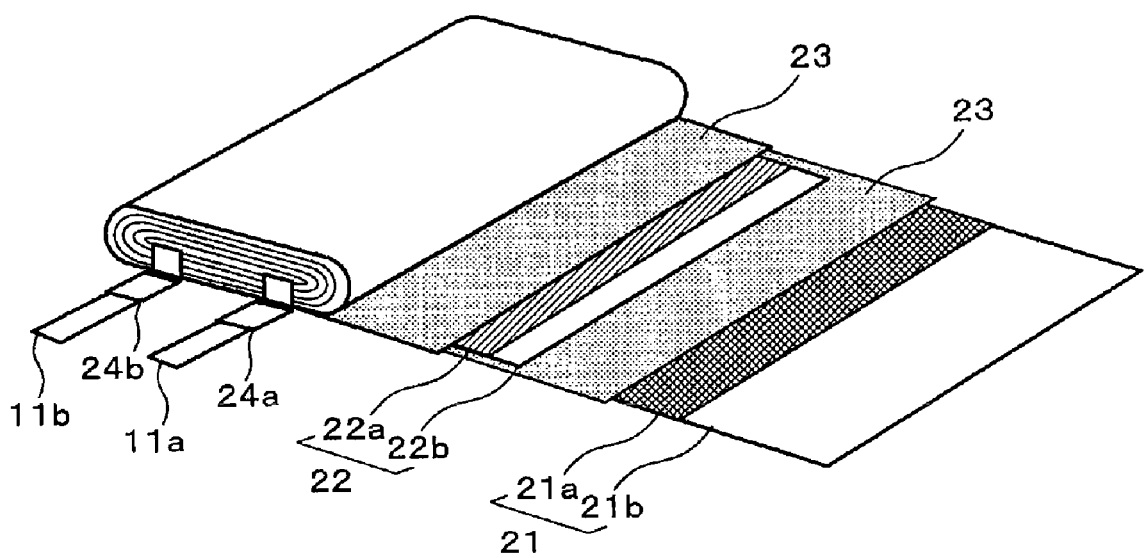
FIG. 7 is a schematic diagram showing one example of the battery element arrangement.

FIG. 7 shows an arrangement in the embodiment of the battery element 10. The battery element 10 is a lamination of the band-shape cathode 21, a separator 23, the band-shape anode 22 disposed so as to oppose the cathode 21, and separator 23 in order that the lamination is rolled in longitudinal direction, and gel electrolytes are formed on the both surfaces of the cathode 21 and the anode 22. Also, the cathode terminal 11a connected to the cathode 21 and the anode terminal 11b connected to the anode 22 are led out from the battery element 10, and resin pieces 24a and 24b are coated on both front and back surfaces of the cathode terminal 11a and the anode terminal 11b respectively in order to improve adhesiveness to laminated film laminating the battery element 10.

The detail of the battery element 10 material is explained below.

Cathode

The cathode 21 is a cathode active material layer 21a containing cathode active material formed on both front and back surfaces of a cathode current collector 21b, The cathode current collector 21b is formed by, for example, aluminum Al foil, and nickel Ni foil or metal foil such as stainless steel SUS foil.

The cathode active material layer 21a includes, for example, cathode active material, conducting material, and binding agent. For cathode active material, public known cathode active material capable of doping and dedoping lithium ion can be used, it is not specifically limited but various oxide such as manganese dioxide, lithium manganese complex oxide, lithium containing nickel oxide, lithium containing cobalt oxide, lithium containing nickel cobalt oxide, lithium containing iron oxide, lithium containing vanadium oxide, and chalcogen compound such as titanium disulfide, molybdenum disulfide are included. Especially, the use of lithium containing cobalt oxide (for example, $LiCoO_2$), lithium containing nickel cobalt oxide (for example, $LiNi_{0.8}Co_{0.2}O_2$), lithium manganese complex oxide (for example, $LiMn_2O_4$, $LiMnO_2$) is preferable since high voltage can be obtained. For cathode active material, either the single use of one type oxide or the mixture use of two or more types oxide is possible.

As cathode active material, several types of the aforementioned cathode active material can be mixed to use.

For conducting material, carbon material etc. such as carbon black or graphite are used. Also, for binding agent, for example, polyvinylidene fluoride, polytetrafluoroethylene, polyvinylidene fluoride, etc. are used. For solvent, for example, N-methyl pyrrolidone, etc. are used.

The electrode 21 has the cathode terminal 11a connected to one end of the cathode current collector 21b by spot welding or ultrasonic welding. The cathode terminal 11a is preferably metal foil and mesh type, but the use of other material than metal has no problem if the material is electrically and chemically stable and has conductivity. The material of the cathode terminal 11a includes, for example, aluminum Al, etc.

Anode

The anode 22 is an anode active material layer 22a containing an anode active material formed on both front and back surface of an anode current collector 22b. The anode current collector 22b is formed by, for example, copper Cu foil and nickel Ni foil, or metal foil such as stainless steel SUS foil.

The anode active material layer 22a includes, for example, anode active material, conducting material if necessary, and binding agent. For anode active material, carbon material capable of doping and de-doping lithium and crystalline, non-crystalline metal oxide are used. Specifically, carbon material capable of doping and de-doping lithium includes graphite, non-easy-graphitizable carbon material, easy-graphitizable carbon material, high crystalline carbon material with developed crystal structure, etc. More specifically, thermal decomposition carbons, cokes (pitch coke, needle coke, petroleum coke), graphite, glass y carbons, organic polymer compound burned substance (obtained by burn phenol resin, furan resin, etc. at proper temperature and carbonized), carbon material such as carbon fiber, activated carbon, carbon black or polymer such as poly acetylene can be used.

Also, anode active material includes metal capable of forming alloy with lithium, or alloy compound of such metal. Alloy compound here is specifically compound expressed by $M_pM'_qLi_r$, wherein M is metal element capable of forming alloy with lithium, M' is lithium Li element and one or more metal element other than M element. P is numeric value above 0, and q and r are numeric value above 0. In addition, the embodiment of the present invention includes semiconductor element such as B, Si, as metal element. Specifically, each metal and its alloy compound of magnesium Mg, boron B, aluminum Al, gallium Ga, indium In, silicon Si, germanium Ge, tin Sn, lead Pb, antimony Sb, bismuth Bi, cadmium Cd, silver Ag, zinc Zn, hafnium Hf, zirconium Zr, yttrium Y, in other words, for example Li—Al, Li—Al-M (wherein M includes one or more 2A group, 3B group, and 4B group transition metal element), and AlSb, CuMgSb, etc. are included.

In the above mentioned elements, it is preferred to use 3B group typical element as element capable of forming alloy with lithium. Especially element such as Si and Sn or its alloy is preferable to be used, and S or Si alloy is more preferable. Si alloy or Sn alloy specifically is compound expressed by MxSi, MxSn (wherein M is one or more metal element other than S or Sn), and specifically includes $SiB$, $SiB_6$, $Mg_2Si$, $Mg_2Sn$, $Ni_2Si$, $TiSi_2$, $MoSi_2$, $COSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, etc.

Furthermore, 4B group compound other than carbon including one or more non-metal element can be used as anode material of the embodiment of the present invention. In the anode material, more than two types of 4B group elements can be included. Also, metal element other than 4B group including lithium can be included. For example, SiC, $Si_3N_4$, $Si_2N_2O$, $Ge_2N_2O$, $SiO_\square$ ($0<x\leq2$), $SnO_\square$ ($0<x\leq2$), LiSiO, LiSNO, etc., are included.

For binding agent, for example, polyvinylidene fluoride, styrene butadiene rubber, etc. are used. For solvent, for example N-methyl pyrrolidone, methyl ethyl ketone, etc. are used.

The anode 22 has the anode terminal 11b connected to one end of the anode current collector 22b by spot welding or ultrasonic welding similarly to the cathode 21. The anode terminal 11b is preferably metal foil and mesh type, but the use of other material than metal has no problem if the material is electrochemically and chemically stable and has conductivity. The material of the anode terminal 11b includes, for example, copper Cu, nickel Ni, etc.

Electrolyte

The electrolyte includes electrolytic solution and polymer compound working as a holder for holding the electrolytic solution, and is form of gel. It is preferred to use the gel electrolyte since it can obtain high ion conductivity and can prevent battery leakage at the same time.

For electrolytic solution, non-aqueous electrolytic solution in which electrolyte is dissolved in nonaqueous solvent can be used. It is preferred that the nonaqueous solvent includes, for example, at least either one of ethylene carbonate or propylene carbonate. This is because cycling characteristics can be improved. Specifically, it is preferred to include the mixture of ethylene carbonate and propylene carbonate, since cycling characteristics can be more improved.

It is also preferred that the nonaqueous solvent includes at least one type of chain carbonic ester such as diethyl carbonate, dimethyl carbonate, ethyl methyl carbonate, or methyl propyl carbonate. This is because cycling characteristics can be improved.

It is furthermore preferred that the nonaqueous solvent includes at least either one of 2,4-difluoro anisole or vinylene carbonate. This is because 2,4-difluoro anisole can improve discharge capacity, and vinylene carbonate can improve cycling characteristics. Specifically, it is more preferred to include the mixture of these, since both discharge capacity and cycling characteristics can be more improved.

The nonaqueous solvent further may include one or more types of butylene carbonate, γ-butyrolactone, γ-valerolactone, compound of these of which a part or whole of hydrogen radical is replaced with fluorine radical, 1,2-dimethoxy ethane, tetrahydrofuran, 2-methyl tetrahydrofuran, 1,3-dioxolan, 4-methyl-1,3-dioxolan, methyl acetate, methyl propionate, acetonitrile, glutaronitrile, adiponitrile, methoxy acetonitrile, 3-methoxy propyronitrile, N,N-dimethyl formamide, N-methyl pyrrolidinone, N-methyl oxazolidinone, N,N-dimethyl imidazolidinone, nitro methane, nitro ethane, sulfolane, dimethyl sulfoxide or phosphorus oxide trimethyl, etc.

Depending on electrode to combine, the use of a part or whole hydrogen atom of substance included in the aforementioned nonaqueous solvent group replaced by fluorine atom may improve the reversibility of electrode reaction. Therefore, these substances can be used appropriately.

For the lithium salt as electrolyte salt suites, for example, $LiPFe_6$, $LiBF_4$, $LiAsF_6$, $LiClO_4$, $LiB(C_6H_5)_4$, $LiB(C_6B_5)_4$, $LiCH_3SO_3$, $LiCH_3SO_3$, $LiN(SO_2CF_3)_2$, $LiC(SO_2CF_3)_3$, $LiAlCl_4$, $LiSiF_6$, LiCl, $LiBF_2(ox)$, LiBOB or LiBr, and one or more types of these are mixed to use Especially, $LiPF_6$ is preferred since it allows obtain of high ion conductivity as well as enhance of cycling characteristics.

The polymer compound includes, for example, polyacrylonitrile, polyvinylidene fluoride, mixed polymer of polyvinylidene fluoride and polyhexafluoropropylene, polytetrafluoroethylene, polyhexafluoropropylene, polyethylene oxide, polypropylene oxide, polyphosphazene, polysiloxane, poly vinyl acetate, polyvinyl alcohol, poly methyl methacrylate, polyacrylic acid, polymethacrylic acid, styrene-butadiene rubber, nitrile-butadiene rubber, polystyrene, and polycarbonate. Especially, taking into account of electrochemical stability, polyacrylonitrile, polyvinylidene fluoride, polyhexafluoropropylene, polyethylene oxide, etc. are preferred.

Separator

The separator 23 is formed by porous film including poly olefin material such as polypropylene PP or polyethylene PE, or porous film including non-organic material such as ceramic nonwoven fabric, or can be a structure where two or more types of these porous films are laminated. Especially, polyethylene, polypropylene porous film is the most effective.

Typically the separator 23 thickness of 5 μm to 50 μm can be preferably used, but it is more preferred to be 7 μm to 30 μm. Too thick separator 23 reduces filler content of active substance, which results in the reduction of battery capacity as well as current characteristics due to decrease of ion conductivity. Contrary, too thin separator reduces mechanical strength of the film.

Next, how to fabricate a battery element which is applicable to one embodiment in the present invention is explained.

How to Fabricate a Battery Element

First, how to fabricate a battery element 10 is described. The cathode 21 and the anode 22 are respectively applied precursor solution including solvent, electrolyte salt, polymer compound, and combined solvent, and then the combined solvent is volatilized to from gel electrolyte. After then, the cathode terminal 11a is welding attached to the end of the cathode current collector 21b, while the anode terminal 11b is welding attached to the end of the anode current collector 22b. Next, the cathode 21 formed gel electrolyte and the anode 22 are laminated through the separator 23 to form a laminated body, and then the laminated body is rolled in the longitudinal direction thereof.

When the cathode terminal 11a and the anode terminal 11b are attached at the beginning side of the roll of the cathode current collector 21b and the anode current collector 22b, the cathode terminal 11a and the anode terminal 11b are led out from the vicinity of the center of the rolled battery element 10.

In this case, the cathode terminal 11a and the anode terminal 11b of the battery element 10 are bent to a main surface of the flattened type battery element 10 so as to go along with the end side, and are cranked so as to be in the same surface of the main surface. And then, the both surface of the cranked cathode terminal 11a and the anode terminal 11b are respectively coated with resin pieces 24a and 24b.

The cathode terminal 11a and the anode terminal 11b, not limited in this example, may be attached to, for example, the end side of the roll of the cathode current collector 21b and the anode current collector 22b. When the cathode terminal 11a and the anode terminal 11b are attached to the end side of the roll of the cathode current collector 21b and the anode current collector 22b, the cathode terminal 11a and the anode terminal 11b are led out from the same surface of the main surface of the flattened type battery element 10. Such configuration of the battery element 10 can omit the process for cranking the electrode terminal 11, which results in effective fabrication of the battery element 10.

How to Fabricate a Battery Cell

Figure 8:
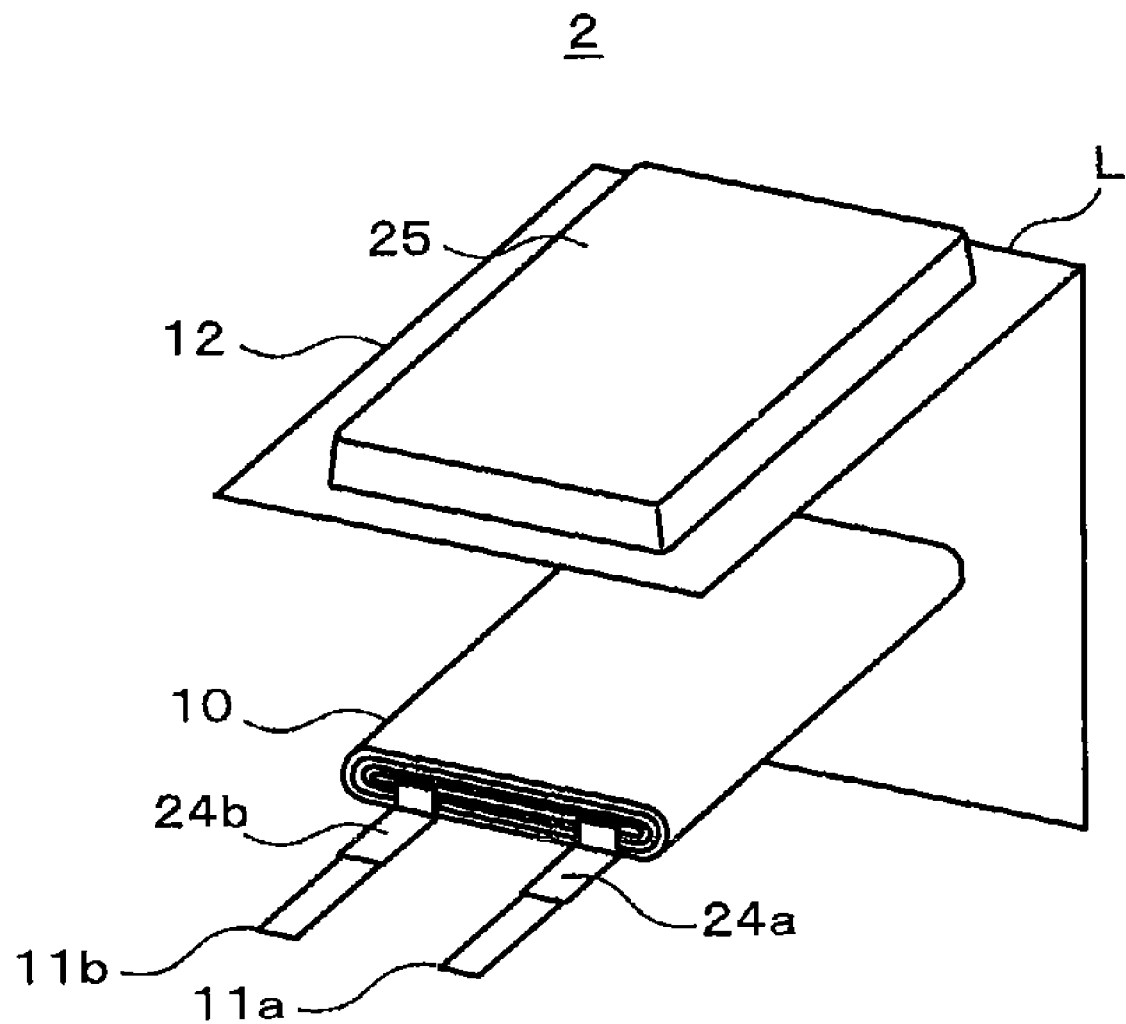
FIG. 8 is a perspective view showing a fabrication process of the battery cell.

Next, how to fabricate a battery cell 2 by using the battery element 10 made as described above is explained. Referring to FIG. 8, a recess 25 is formed on the soft laminated film 12 with deep drawing and the battery element 10 made as described above is accommodated in the recess 25. And then, the soft laminated film 12 is bent so as to cover the opening of the recess 25. Next, three sides except, bent line L of the battery element 10 are sealed by heat-welding, etc. At that time, the resin pieces 24a and 24b coated part of the cathode terminal 11a and the anode terminal 11b are led out to outside with being sandwiched by the soft laminated film 12.

Figure 9:
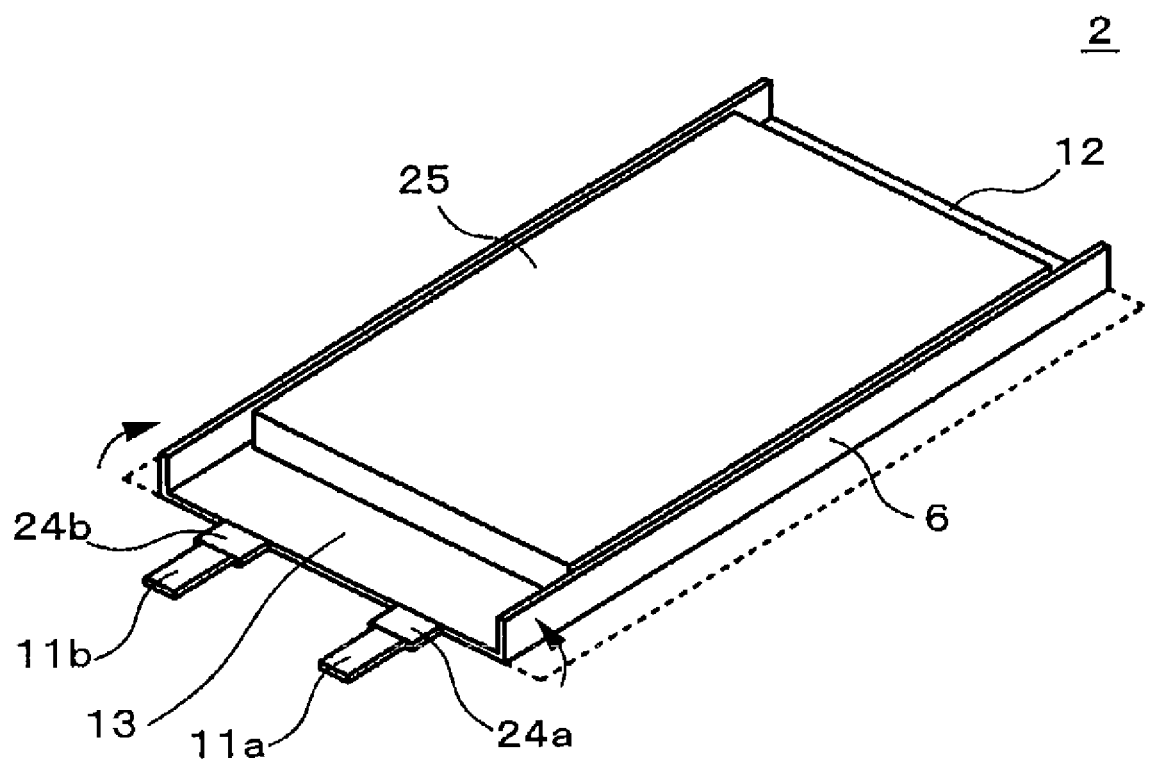
FIG. 9 is a perspective view showing a fabrication process of the battery cell.

And then, as shown in FIG. 9, opposing two sides of sealed three sides are bent in the direction indicated by arrows, which forms wall portions 6. Also, a surface including sides in which the cathode terminal 11a and the anode terminal 11b are led out is formed as the drawer portion 13. In this manner, the battery cell 2 is fabricated.

In the case of the battery element 10 using electrolytic solution, electrolytic solution is input before the soft laminated film 12 is sealed by heat-welding. For example, after two sides except the bent side of the battery element is heat-welded, a predetermined amount of electrolytic, solution is input from the remained opening, and finally the opening is heat-welded.

How to Fabricate a Battery Pack

Next, how to fabricate a battery pack 1 by using the battery cell 2 made is explained. The lengths of the cathode terminal 11a and the anode terminal 11b of the battery cell 2 are controlled by, for example, cut or bent, in order to connect to the contact member for cathode 42a and the contact member for anode 42b. For example, the length of the anode terminal 11b is controlled so as to be shorter in a predetermined extend than the length of the cathode terminal 11a.

The length difference between the cathode terminal 11a and the anode terminal 11b is preferably approximately equal to the position difference d between the contact member for cathode 42a and the contact member for anode 42b. Specifically, if is preferred that the length difference between the cathode terminal 11a and the anode terminal 11b is 2 mm or more and 10 mm or less.

Also, the length of the cathode terminal 11a and the anode terminal 11b can be adjusted in advance, for example, on the fabrication of the battery element 10. Specifically, for example, on the fabrication of the battery element 10, when the anode terminal 11b is welded at the end of the anode current collector 22b, it is preferred to attach the anode terminal 11b so as to previously be shorter than the cathode terminal 11a Such a plurality of battery cells 2, 2, . . . , are arranged so that electrode terminals 11 thereof face to the same direction, and a part of the cell connection substrate 3 is disposed on the drawer portion 13 provided on the plurality of battery cells 2, 2, . . . . Also, when the cell connection substrate 3 is disposed on the drawer portion 13, since the cutout 41 provided at the edge of the cell connection substrate 3 are configured to avoid wall portions 6 of the sides of the battery cell 2, the cell connection substrate 3 can be disposed on the drawer portion 13 without touching battery cell 2.

Next, the contact member for cathode 42a and the contact member for anode 42b provided at the back surface of the cell connection substrate 3 are connected to the cathode terminal 11a and the anode terminal 11b by resistance welding, ultrasonic welding, or soldering, etc. At that time, the contact member for cathode 42a and the contact member for anode 42b can be directly connected to the cathode terminal 11a and the anode terminal 11b without using any relay, tab, etc.

Then, the cell connection substrate 3 is connected to the circuit substrate 4 by the use of the connection member 5. For example, in the case where the connection member 5 is a connector, a connector provided on the cell connection substrate 3 is fitted to a cell connection substrate 3 side connector of the connection member 5, while a connector provided on the circuit substrate 4 is fitted to a circuit substrate 4 side connector of the connection member 5. Furthermore, for example, in the case where the connection member 5 is a wire rod, one end of the wire rod is connected to the cell connection substrate 3, and the other end is connected to the circuit substrate 4. This establishes physical and electrical connection between the cell connection substrate 3 and the circuit substrate 4.

The battery cell 2, 2, . . . , the cell connection substrate 3 and the circuit substrate 4 connected as described above are accommodated in the enclosure to complete the fabrication of the battery pack 1.

The order of the process for connecting the cell connection substrate 3 and the battery cell 2, 2, . . . , and the process for connecting the cell connection substrate 3 and the circuit substrate 4 can be switched appropriately in accordance with work efficiency, etc. of the battery pack 1 fabrication.

As described above, in the embodiment, the cell connection substrate 3 is configured to be disposed on the drawer portion 13. This enables efficient use of the space in the battery pack 1, improvement of volumetric efficiency of the battery pack 1 and downsizing of the battery pack 1.

In addition, the cell connection substrate 3 and the circuit substrate 4 can be separated in this configuration, even for a battery pack with different shape or size, the size or quantity of the battery cell to be used is equivalent, the cell connection substrate 3 can be used, which reduces the design cost. Moreover, the cell connection substrate 3 can be detached from a recovered battery pack to recycle.

Moreover, by providing position difference between the contact member for cathode 42a and the contact member for anode 42*b*, patterned wiring can wire linearly, which results in effective wiring of the patterned wiring in the cell connection substrate 3.

Additionally, since the patterned wiring in the cell connection substrate 3 can be effectively wired, the width of the patterned wiring can be wider, which results in the restrain of heat during large current flow.

Furthermore, by providing the length difference between the cathode terminal 11*a* and the anode terminal 11*b* of the battery cell 2, for example, when using a battery cell where the front and back surfaces are too similar to recognize, the polarity of electrode terminal can be judged easily.

It should be understood by those skilled in the art that various modifications, combinations, sub-combinations and alterations may occur depending on design requirements and other factors insofar as they are within the scope of the appended claims or the equivalents thereof. For example, it was explained that the anode terminal 11*b* was made to be the predetermined extent shorter than the cathode terminal 11*a*, but is not limited to, can make the cathode terminal 11*a* to be a predetermined extent shorter than the anode terminal 11*b*.

In addition, in the embodiments, the electrode, electrolyte and the separator laminated and rolled battery element was explained as an instance, but it is not limited to this instance. For example, an electrode, electrolyte and separator laminated stuck structure battery element can also he used.

Furthermore, the use of the battery element using polymer electrolyte for electrolyte used for the battery element was explained, but is not limited to, for example, a battery element using electrolytic solution may be used.

Moreover, in the embodiments, the flattened type battery cell where the battery element was coated by the soft laminated film was explained, but is not limited to this instance. For example, a square shape tin battery cell having a drawer portion and wall portions may be used. In other words, any battery cell having the drawer portion and wall portions can be used, not only flattened type but no matter what shape of battery cell.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A battery pack comprising:
a plurality of batteries;
a connection substrate connected to the plurality of batteries;
a circuit substrate for connecting an external electronic device; and
a connection member that connects the connection substrate to the circuit substrate,
wherein each battery has a drawer portion for leading out a cathode terminal and an anode terminal provided on a same side of the battery,
each drawer portion having wall portions standing against the drawer portion so that side portions of the drawer portion are opposed to each other,
the plurality of batteries are arranged in a row so that the drawer portions of the plurality of batteries face a same direction,
parts of the connection substrate are disposed on a plurality of the drawer portion, and
a rim of the connection substrate is provided with cutouts to let the wall portions be disposed therein.

2. The battery pack according to claim 1, wherein the connection substrate comprises:
a plurality of first contact members connected to cathode terminals of the plurality of batteries respectively;
a plurality of second contact members connected to anode terminals of the plurality of batteries respectively;
a first patterned wiring for connecting the plurality of first contact members; and
a second patterned wiring for connecting the plurality of second contact members,
wherein the plurality of first contact members are arranged onto a straight line,
wherein the plurality of second contact members are arranged onto another straight line parallel to the former straight line, and
wherein the first patterned wiring and the second patterned wiring are provided in parallel.

3. The battery pack according to claim 2, wherein the difference in the vertical position against the straight lines of the first contact members and the second contact members is 2 mm or more and 10 mm or less.

4. The battery pack according to claim 1, wherein the connection substrate and the circuit substrate are disconnectable by means of the connection member.

5. The battery pack according to claim 1, wherein the connection substrate is a double-face substrate.

6. The battery pack according to claim5, which includes:
a plurality of first contact members connected to cathode terminals of the plurality of batteries respectively;
a plurality of second contact members connected to anode terminals of the plurality of batteries respectively;
a first patterned wiring for connecting the plurality of first contact member on a back surface of the double-face substrate; and
a second patterned wiring for connecting the plurality of second contact members on a front surface of the double-face substrate.

7. The battery pack according to claim 1, wherein the cutouts are shaped to align the connection substrate for disposition on the plurality of the drawer portions.

* * * * *